United States Patent [19]

Liebegott

[11] 4,224,551
[45] Sep. 23, 1980

[54] VEHICLE HEADLIGHT WITH A DIRT SENSOR

[75] Inventor: Klaus Liebegott, Munich, Fed. Rep. of Germany

[73] Assignee: Bayerische Motoren Werke Aktiengesellschaft, Fed. Rep. of Germany

[21] Appl. No.: 32,344

[22] Filed: Apr. 23, 1979

[30] Foreign Application Priority Data

Apr. 25, 1978 [DE] Fed. Rep. of Germany ....... 2818019

[51] Int. Cl.$^2$ .................... F21V 33/00; B60Q 11/00
[52] U.S. Cl. .................... 313/323; 362/61; 362/253; 356/342
[58] Field of Search ............... 313/323, 324; 362/253, 362/61; 356/338, 342; 250/215; 239/284 A

[56] References Cited

U.S. PATENT DOCUMENTS 3,609,450  9/1969  Hart ................. 250/215 X

Primary Examiner—Alfred E. Smith
Assistant Examiner—Charles F. Roberts
Attorney, Agent, or Firm—Craig & Antonelli

[57] ABSTRACT

A vehicle headlight is disclosed comprising a dirt sensor for sensing dirt on a diffuser disk of the headlight. The dirt sensor receives the light of a lamp of the headlight scattered back due to dirt on the diffuser disk and is shielded against the light emanating directly from the lamp and emanating indirectly via a reflector. The dirt sensor of the headlight is arranged at a point outside of the reflector to which the scattered-back light passes via reflection on the reflector whereby changes to the reflector for accommodating the dirt sensor and the concomitant reduction of the effective surface area of the reflector are avoided.

7 Claims, 1 Drawing Figure

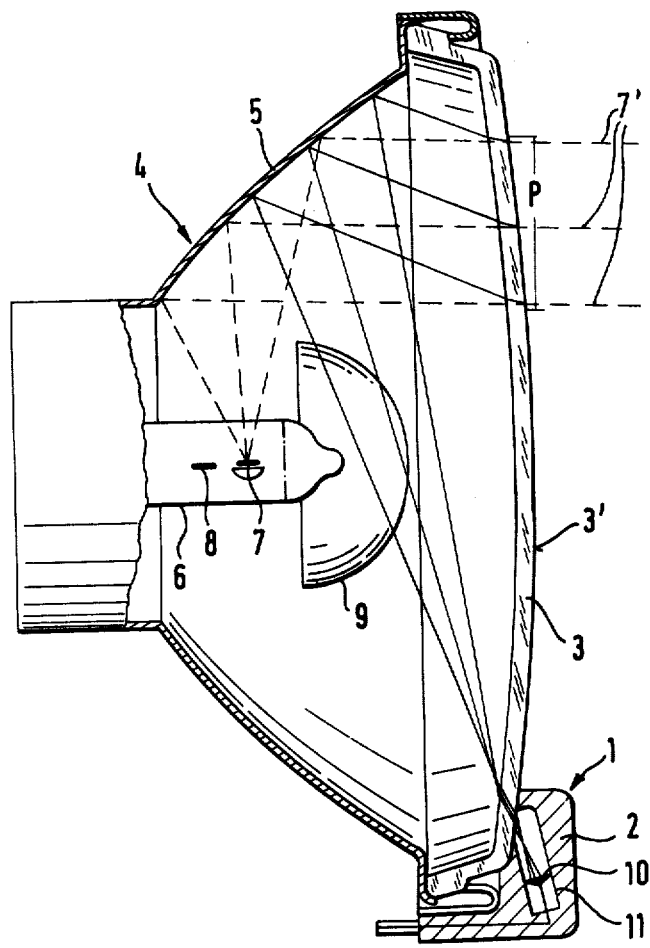

VEHICLE HEADLIGHT WITH A DIRT SENSOR

BACKGROUND AND SUMMARY OF THE INVENTION

The present invention relates to a vehicle headlight with a dirt sensor for a diffuser disk, this sensor receiving the light of a lamp, such as an incandescent lamp, scattered back due to dirt on the diffuser disk and being shielded against the light emanating directly from this lamp and emanating indirectly via a reflector.

A headlight of this type has been known, see DOS [German Unexamined Laid-Open Application] No. 2,137,231, the sensor of which receives directly the light reflected on the dirt on the diffuser disk. In this known headlight the sensor is arranged in the interior of the headlight, especially within a bore of the reflector. However, such an arrangement is disadvantageous in that the bore impairs the optical properties of the reflector and thus of the headlight, on the one hand, by a possible alteration in the parabolic configuration of the reflector during and after production of the bore and, on the other hand, by a reduction of the effective surface area for light emission. Furthermore, sealing problems can occur with such an arrangement in the case of hermetically sealed headlights such as sealed beam headlights.

Thus, an object of the present invention is to overcome the aforementioned disadvantages of the known headlight with dirt sensor and, specifically, to arrange, in a vehicle headlight of the type described hereinabove, the dirt sensor without changes to the reflector and without reduction of the effective surface area of the reflector.

This and other objects of the present invention are attained according to the present invention by arranging the sensor at a point outside of the reflector, the back-scattered light being transmitted to this point via reflection on the reflector.

The light scattered by the dirt on the diffuser disk passes, in part, indirectly via reflection on the reflector into the sensor. Therefore, the reflector, on the one hand, aligns the light of the headlight lamp and, on the other hand, reflects the light scattered on the dirt into the sensor.

According to one form of the present invention the dirt sensor can be arranged on the inside of the diffuser disk. Alternatively, the sensor can be mounted in an airtight fashion on the outer surface of the diffuser disk in which case it is possible to attach the sensor subsequent to the manufacture of the headlight. Such attachment can be carried out on an installed headlight and does not require any alteration of the latter.

An especially advantageous arrangement of the dirt sensor according to the present invention, in a headlight emitting a low beam from one of its halves, resides in arranging the sensor in the other, "dark" half. The sensor in this case is located in a zone into which falls no light from the headlight lamp, either directly or by reflection on the reflector. A special shielding of this light can in this case be omitted.

According to the present invention the sensor can also be arranged at the rim of the diffuser disk. In such an arrangement the sensor does not impair the optical properties of the headlight and cannot be discerned from the outside. If it is additionally located in the "dark" half of a low-beam headlight, then the high-beam light normally emitted from this headlight is not impaired in any way, either.

The sensor can furthermore be aligned with or oriented toward a zone of the reflector located laterally with respect to the plane determined by the axis of the headlight and the position of the sensor. In such a case, essentially only such light passes into the sensor which is reflected from dirt on the diffuser disk, so that a shielding of the light from the headlight lamp, emitted either directly or indirectly, is extensively eliminated. Furthermore, due to such alignment or orientation of the sensor, an impairment of the light stemming from the dirt accumulation by a parabolic bulb reflector customary in headlights for directly emitted light from the headlight lamp is avoided.

BRIEF DESCRIPTION OF THE DRAWING

These and other objects features and advantages of the present invention will become more apparent from the following description when taken in connection with the accompanying drawing which shows, for purposes of illustration only, one embodiment of the present invention of an automobile headlight with a dirt sensor receiving light reflected from dirt on the diffuser disk via reflection on the reflector of the headlight.

DETAILED DESCRIPTION OF THE DRAWING

According to the embodiment of the present invention illustrated in the drawing a dirt sensor 1 is mounted airtight in a housing 2 on the external surface 3' at the rim of a diffuser disk 3 of a combined high-beam and low-beam headlight 4. This headlight comprises a reflector 5, an incandescent lamp 6 with a low-beam filament 7 and a high-beam filament 8, as well as a parabolic bulb reflector 9 for light emitted by the incandescent lamp 6 directly onto the diffuser disk 3. The low-beam light 7' exits solely from the upper half, whereas the high beam, not shown, also exits from the lower half of the diffuser disk 3.

The sensor 1 has a light-sensitive surface 10 arranged hidden within a tube 11. The sensor is oriented so that it is inclined by a small angle with respect to the plane of the drawing and receives light reflected, in case of dirt accumulation, from a zone on the outside 3' of the diffuser disk 3, this zone being outside of the plane of the drawing and the projection of which onto the plane of the drawing is denoted by P. By means of this orientation, an effect of the parabolic bulb reflector 9 on this light is avoided. At the same time, the construction and arrangement of the sensor 1 ensure that the light-sensitive surface 10 of this sensor does not receive light emitted directly from filaments 7 and 8 and/or from a simple reflection on the reflector in indirect fashion.

The sensor—by means of an appropriate circuit connecton to the illumination circuits—is effective in case of switching to low beam and/or high beam. The amount of light received by the sensor and thus its output signal is the larger, the bigger the dirt accumulation on the diffuser disk 3. If such dirt accumulation exceeds a given value, then an indicator for the driver is triggered and/or a headlight cleaning device, not shown, is automatically activated. In the latter case, the sensor 1 can also be utilized for switching off the cleaning device when the impinging amount of light, diminishing during the cleaning operation, has dropped below a predetermined value.

The sensor 1 can be mounted to the diffuser disk 3 subsequent to the manufacture of the headlight. The sensor can also be arranged with the headlight, for example on the inside of the diffuser disk. However, in any case, the sensor is arranged outside of the reflector, so that the latter is not affected with respect to its optical properties. By the location of the sensor 1 at the rim of the diffuser disk in the half of the diffuser which is "dark" during low-beam illumination, neither the low-beam nor the high-beam illumination is impaired.

Furthermore, by shielding the light of the incandescent lamp emitted directly or indirectly by simple reflection on the reflector, and optionally by the provision of additional delay elements, it is ensured that vehicles traveling in the opposite direction, the light of which impinges extensively in parallel to the axis of the headlight, cannot exert any influence on the sensor. This light, due to the geometric characteristics of the headlight, cannot pass into the sensor, either, and/or cannot become effective due to the response delay provided.

While we have shown and described only one embodiment in accordance with the present invention, it is understood that the same is not limited thereto but is susceptible of numerous changes and modifications as would be known to those skilled in the art, given the present disclosure, we therefore do not wish to be limited to the details shown and described herein but intend to cover all such changes and modifications as are encompassed by the scope of the appended claims.

I claim:

1. In a vehicle headlight comprising dirt sensor means for sensing dirt on a diffuser disk of said headlight, said dirt sensor means receiving the light of a lamp of said headlight scattered back due to dirt on the diffuser disk and being shielded against the light emanating directly from said lamp and emanating indirectly via a reflector wherein the improvement comprises said dirt sensor means is arranged at a point outside of the reflector to which the scattered-back light passes via reflection on the reflector.

2. A vehicle headlight according to claim 1, wherein the dirt sensor means is mounted airtight on the outer surface of the diffuser disk.

3. A vehicle headlight according to claim 1 or 2, wherein said headlight emits a low-beam light from one of its halves, and wherein the dirt sensor means is arranged at the other half.

4. A vehicle headlight according to claim 3, wherein said dirt sensor means is arranged at the rim of the diffuser disk.

5. A vehicle headlight according to claim 4, wherein said dirt sensor means is oriented toward a zone of the reflector located laterally with respect to a plane determined by the axis of the headlight and the position of the sensor.

6. A vehicle headlight according to claim 1, wherein said dirt sensor means is arranged at the rim of the diffuser disk.

7. A vehicle headlight according to claim 1, wherein said dirt sensor means is oriented toward a zone of the reflector located laterally with respect to a plane determined by the axis of the headlight and the position of the sensor.

* * * * *